United States Patent Office 3,356,761
Patented Dec. 5, 1967

3,356,761
MELT PROCESSABLE POLYPHENYLENE ETHER AND PROCESS
Daniel W. Fox, Pittsfield, Mass., assignor to General Electric Company, a corporation of New York
No Drawing. Filed Apr. 12, 1967, Ser. No. 630,196
26 Claims. (Cl. 260—874)

ABSTRACT OF THE DISCLOSURE

A composition consisting of a high molecular weight polyphenylene ether and a liquid polymerizable vinyl unsaturated material. The vinyl material acts as a plasticizer for the polyphenylene ether, thus allowing relatively low temperature melt processing to form curable articles such as film and fiber.

Introduction

This application is a continuation-in-part of application Ser. No. 337,144, filed Jan. 13, 1964, now abandoned.

The present invention relates to a polyphenylene ether composition that may be melt processed at relatively low temperatures. More particularly, the invention relates to a composition consisting of a polyphenylene ether of high molecular weight, a liquid polymerizable vinyl unsaturated material of low molecular weight, and optionally, a crosslinking agent for the vinyl material. The invention also relates to a process for forming articles of manufacture such as film and fiber from a polyphenylene ether composition using melt processing procedures.

Background of the invention

The polyphenylene ethers are known and described in numerous publications including U.S. Patents Nos. 3,306,874 and 3,306,875 of Allan S. Hay and U.S. Patents Nos. 3,257,357 and 3,257,358 of Gelu Stoeff Stamatoff. The high molecular weight polymers are high performance engineering thermoplastics possessing relatively high softening points, i.e., in excess of 275° C., and are suitable for a wide variety of commercial applications including formation of film and fiber. However, film and fiber development has been somewhat impaired due to the high temperatures required to soften the plastic. Heretofore, film and fiber could only be formed on a commercial scale from solution; melt processing being commercially impractical because of the required high temperatures needed to soften the polymer and the problems associated therewith such as polymer instability, and discoloration and the requirement for specially designed process equipment.

In general, melt processing is preferred to solution techniques because thicker cross sections for both film and fiber are obtainable thereby. In addition, the problems of solvent handling and recovery associated with solution casting and spinning are avoided when film and fiber are formed from the melt.

Statement of the invention

The present invention is predicated upon the discovery that a liquid polymerizable vinyl unsaturated compound, when added to a high molecular weight polyphenylene ether, acts as a plasticizer therefor, and lowers the processing temperature of the polymer to a point where it can be melt processed at relatively low temperatures using conventional melt processing equipment. It has also been found that film and fiber so formed maintain their structural integrity even when the liquid vinyl component constitutes as much as 50%, by weight, of the total composition. They can be cured in accordance with known procedures, such as by exposure to heat or irradiation. This results in film and fiber having properties far superior to the properties of film and fiber formed from the polymerized vinyl compound alone and approximating the properties of film and fiber formed from the polyphenylene ethers.

A further advantage of the use of a vinyl unsaturated compound in combination with a polyphenylene ether is that the vinyl compound tends to substantially improve the oxidation resistance of the polymer and this prevents, to a large extent, embrittlement and discoloration when the polymer is exposed to an oxygen containing atmosphere at an elevated temperature. Also, it has been found that fibers and fabrics formed from polyphenylene ethers are not dry cleanable without special processing because of solubility in dry cleaning organic liquids. The addition of a vinyl unsaturated compound and a crosslinking agent therefore, following cure, provides a highly cross-linked matrix containing polyphenylene ether that is substantially insoluble in dry cleaning fluids.

Accordingly, an object of this invention is to provide a polyphenylene ether composition suitable for formation of articles of manufacture such as film and fiber by melt processing, consisting of a high molecular weight polyphenylene ether, a liquid polymerizable vinyl unsaturated material, and optionally, a crosslinking agent for the vinyl material.

Another object of this invention is to provide a method for melt processing a polyphenylene ether composition.

A third object of this invention is to provide a polyphenylene ether composition resistant to oxidative attack.

A further object of this invention is to provide a polyphenylene ether composition resistant to dry cleaning solvents.

Other objects and advantages of this invention will be, in part, apparent and, in part, pointed out in the description which follows.

Detailed description of the invention

In one of its broader aspects, the objects of the present invention are achieved by finely dissolving a higher molecular weight polyphenylene ether in a lower molecular weight vinyl unsaturated liquid component capable of polymerization, and by polymerizing the liquid component to a higher molecular weight.

The expression "polymerizable vinyl unsaturated liquid component" as used throughout this specification is meant to include a compound or a mixture of compounds liquid at room temperature or at elevated temperatures of up to 100° C. and selected from the group consisting of:

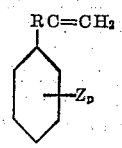

and

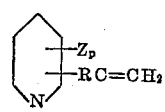

where R is hydrogen or methyl; Z is a member selected from the class consisting of vinyl, hydrogen, halogen (e.g., chlorine, bromine, iodine and fluorine), alkyl (e.g., methyl, ethyl, propyl, isopropyl, butyl, octyl, etc.), alkoxy (e.g., methoxy, ethoxy, propoxy, isopropoxy, butoxy, etc.); and $p$ is a whole number equal to from 0 to 3.

The preferred vinyl unsaturated materials are styrene and mixtures of styrene and divinyl benzene.

The polyphenylene ether is one selected from those disclosed in the above referenced patents of Hay and Stamatoff and preferably, has a molecular weight of at least 10,000 and more preferably in excess of 50,000 with an intrinsic viscosity of at least 0.5 deciliter per gram (dl./g.) as measured in a 0.5%, by weight, cloroform solution at 30° C.

The method of forming the blend of the vinyl material and the polyphenylene ether is not critical, any of the methods well known in the prior art being suitable. For example, the components may be mixed in a blender such as a Waring Blendor or in conventional rubber milling equipment. Alternatively, the vinyl material and polymer may be dissolved in a common solvent and recovered therefrom by solvent evaporation or by precipitation with a non-solvent.

The quantity of vinyl material combined with the polyphenylene ether may vary within broad limits, but should not be used in an amount that would cause complete dissolution of the polymer. Preferably, the mixture of vinyl material and polymer is in the form of free flowing powder or pellets. When an excessive amount of vinyl material is used, a paste or viscous liquid forms that is of little commercial significance. In general, the quantity of vinyl material may vary between 1.0 and 60.0%, by weight, of the total composition, but it should be understood that this is dependent upon the specific materials used and the molecular weight of the polymer. From 15.0 to 40.0% by weight, of vinyl material in the total composition, constitutes a preferred embodiment of this invention.

Following combination of the vinyl material with the polyphenylene ether, the composition may be formed into shaped articles by melt processing using conventional procedures. For example, film and fiber of substantial cross section can be formed by extrusion. The temperature of processing is dependent upon the quantity of vinyl material in the composition and the molecular weight of the polymer. For example, with a mixture consisting of styrene and a linear poly-(2,6-dimethyl-1,4-phenylene) ether having an intrinsic viscosity of about 1.0 dl./g., the extrusion temperature through the orifice is about 160° C. The same polymer free of styrene has an extrusion temperature in excess of 275° C.

If the composition used to form the shaped article is in the form of free flowing powder or pellets, the so formed shaped article will maintain its structural integrity and can be handled and processed without damage. Curing or polymerization of the vinyl strating material may be initiated by almost any source of free radicals including organic peroxide materials such as benzoyl peroxide, dicumyl, peroxide, Varox (R. T. Vanderbilt product), any of which can be included in the initial formulation. A wide variety of organic peroxides may be used including organic diperoxides.

Other means of initiating and carrying out the polymerization include the use of ionizing radiation such as X-radiation, electron beam irradiation, promoted UV radiation, and similar application of ionizing energy.

A further alternative is to use heat alone without added catalyst. This approach requires extended cure time, but has the advantage of not requiring catalysts and provides for very extensive shelf life of the pre-mix.

Articles formed by the above procedures possess excellent physical properties as will be described in the following examples which are set forth for purpose of illustration, but should not be construed as limiting the invention thereto.

*Example 1*

A master batch of five pounds of compound was made by blending equal parts of poly-(2,6-dimethyl-1,4-phenylene)ether powder (intrinsic viscosity 0.65 dl./g. determined in chloroform at 30° C.) and styrene monomer (Eastman-Red Label-stabilized) on a rubber mill at room temperature. When the mixture was thoroughly blended, dicumyl peroxide (Di-Cup 95 from Hercules Powder Co.) was added in the amount of one percent by weight based on the styrene monomer, and in turn blended into the composite. The product at this stage was a tough, free flowing somewhat rubbery powder and transparent in appearance.

Samples of this powder were placed between sheets of Mylar (crystallized and oriented polyethylene terephthalate) and pressed for various periods of time at several temperatures. Heat distortion temperatures were measured for each film so produced. Cure schedule and heat distortion temperature are set forth in the following table.

| Sample No. | Tensile Heat Distortion, ° C. | Cure Schedule | |
|---|---|---|---|
| | | Time (min.) | Temp. (° C.) |
| A | 136 | 10 | 140 |
| B | 164 | 60 | 140 |
| C | 162 | 10 | 161 |
| D | 167 | 30 | 160 |

Some styrene was volatized from each of the samples. From the measurements, it is apparent that the cure time may be shortened by increasing the temperature, or lower temperatures may be used with longer curing times. The processing advantage may be understood from the fact that the polyphenylene ether is conventionally processed at temperatures close to 300° C. in order to obtain the reduction in viscosity required for forming. One property advantage is apparent from the fact that the tensile heat distortion temperature is approximately double that of unmodified polystyrene.

*Example 2*

Three compositions were formed by the method described in Example 1 but with the difference that they contained the following ingredients in parts by weight.

A.

| | Parts |
|---|---|
| Poly(2,6-dimethyl-1,4-phenylene)ether | 50 |
| Styrene | 50 |
| Di-Cup (recrystallized) | 0.5 |
| | 100.5 |

B.

| | Parts |
|---|---|
| Poly(2,6-dimethyl-1,4-phenylene)ether | 50 |
| Divinyl benzene | 10 |
| Styrene | 40 |
| Di-Cup (recrystallized) | 0.5 |
| | 100.5 |

C.

| | Parts |
|---|---|
| Poly(2,6-dimethyl-1,4-phenylene)ether | 50 |
| Atlac 382E (a Bisphenol-A Fumerate type resin— Atlas powder) | 10 |
| Styrene | 40 |
| Di-Cup (recrystallized) | 0.5 |
| | 100.5 |

These composites were all pressed, as described in Example 1, into sheets of 0.010 to 0.020 inch in thickness and cured in a press at 165° C. for 15 minutes. Evaluation of the cured products led to the following data:

| Composition | Modulus, p.s.i. | Elongation, percent |
|---|---|---|
| A | 235,000 | 5.3 |
| B | 234,000 | 6.5 |
| C | 242,000 | 5.4 |

| Composition | Tensile Strength, p.s.i. | Tensile Heat Dist., ° C. |
|---|---|---|
| A | 8,200 | 165 |
| B | 10,400 | 195 |
| C | 9,500 | 180 |

The samples were further tested by wrapping strips around a mandrel (0.5 inch in diameter) and spraying acetone and/or hexane on the strained samples. The samples remained intact but some crazing was noted. Control samples of unmodified polyphenylene ether polymer and polystyrene polymer fractured almost explosively under either one or both of these tests. Sample A was found to be completely soluble in solvents such as chloroform whereas samples B and C were only partially soluble. The polyphenylene ether portion could be extracted to leave a skeleton-like residue of highly cross-linked polymer. This structure is entirely unlike that which would be obtained if polymeric polystyrene and polymeric polyphenylene ether are blended together and passed through an extruder.

Example 3

A composite containing 25 parts styrene, 75 parts polyphenylene ether and 0.5 part Di-Cup was made up on a rubber mill as described in Example 1. The mill had to be heated to 100° C. in order to produce a homogeneous blend. This product was then press-cured at 165° C. for 15 minutes, as described in Example 1, to yield a product with a tensile heat distortion temperature of 185° C.

Example 4

A composition consisting of 50 parts, poly(2,6-dimethyl-1,4-phenylene)ether, 40 parts styrene monomer and 10 parts Atlac 382E without peroxide was prepared as described in Example 1 and cold pressed to 10 mil thickness. It was then passed through an electron beam with a rated output of 13 to 15 megaroentgens. The irradiated product was then immersed in chloroform and found to be partially unsoluble, that is, the arylene oxide component could be extracted with chloroform, whereas the polystyrene-Atlac combination had been cured.

Example 5

To determine the effect of styrene content on the extrusion temperature of a polyphenylene ether, a series of fibers with differing styrene contents were prepared following the procedures of Example 1. Styrene content and extrusion temperatures for each sample are set forth in the following table.

| Styrene content (wt. percent): | Extrusion temp., ° C. |
|---|---|
| 0 | 290 |
| 10 | 235 |
| 15 | 225 |
| 20 | 190 |
| 20 | 160 |
| 30 | 140 |
| 50 | 135 |

All fibers were handable and could be wound without sticking. This allows for collecting the fiber on spools followed by thermal curing at elevated temperatures.

Example 6

The procedure of Example 5 was repeated substituting alpha methyl styrene for styrene with the following results:

| Methyl styrene content (wt. percent) | Extrusion temp., ° C. |
|---|---|
| 0 | 290 |
| 10 | 250 |
| 25 | 170 |

Example 7

Following the procedure of Example 1, a blend was formulated having the following composition:

| | Percent |
|---|---|
| Poly-(2,6-dimethyl-1,4-phenylene)ether | 66.7 |
| Styrene | 30.0 |
| Divinyl benzene | 3.3 |

The composition was formed into a coherent monofilament at a temperature of 125° C. and then insolubilized by maintaining the fiber at 125° C. for thirty minutes.

Example 8

Following the procedure of Example 7, and changing the temperature of extrusion and curing to 160° C., an insoluble fiber was formed from the following composition:

| | Parts |
|---|---|
| Polyphenylene ether | 10 |
| Styrene | 2 |
| Dimethylene methacrylate | ½ |

Examples 9 and 10

Insoluble fiber was formed using the procedures and formulations of Examples 7 and 8, but with cure by irradiation of 9 to 12 milliroentgens.

Example 11

Solutions were prepared from a poly-(2,6-dimethyl-1,4-phenylene)ether and styrene and cast onto glass plates to form films. The films were dried, exposed to 9 to 12 milliroentgens radiation and post cured 1 hour at 85° C. Tensile strength and elongation were measured. Styrene content and measured properties are set forth in the following table:

| Styrene content (wt. percent) | Tensile strength (p.s.i.) | Elongation (percent) |
|---|---|---|
| 20 | 8,500 | 10 |
| 33 | 7,000 | 8 |
| 50 | 6,000 | 5 |

Example 12

The procedure of Example 7 was repeated with the substitution of monochloro-styrene for the combination of styrene and divinyl benzene.

Example 13

The procedure of Example 7 was repeated with the substitution of 2,6-dichlorostyrene for styrene and divinyl benzene.

Example 14

The procedure of Example 7 was repeated with the substitution of vinyl pyridine for styrene and divinyl benzene.

From the foregoing examples several advantages of my novel methods and compositions are evident.

The methods up-grade the thermal-mechanical properties of polystyrene.

The methods use polymerizable vinyl type compounds such as styrene monomer directly in forming blends of polyphenylene ethers with polyvinyl compounds.

In essence plastisol type compositions are formed in which the plasticizer may be later polymerized.

The processing temperature of polyphenylene ethers is lowered by 100° C. or more.

The solvent resistance of both polystyrene and polyphenylene ethers is improved.

The method permits processing at room temperature and curing or polymerizing a monomer component later by heating the peroxide catalyzed composition or by use of high energy radiation curing of uncatalyzed composites at room temperature.

One distinctive advantage of the present invention is in permitting thermal forming of materials including polyphenylene ethers at temperatures far below the forming temperature of the ether material itself. For example, compositions can be formed at room temperature where the phenyl ether polymer contained would require forming at temperatures of about 300° C. and above. Products containing polyphenylene ethers can thus be formed at low temperatures to avoid thermal degradation of the polyphenyl ether at such high forming temperatures as might otherwise be required.

I claim:

1. A melt processable, curable composition comprising a thermoplastic polyphenylene ether of high molecular weight and a liquid, vinyl unsaturated material having a general formula selected from the group consisting of

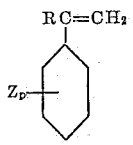

and

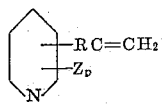

where R is a member selected from the group consisting of hydrogen and methyl; Z is a member selected from the group consisting of vinyl, hydrogen, halogen, alkyl and alkoxy; and p is a whole number equal to from 0 to 3, said vinyl unsaturated material constituting from 1 to 60%, by weight of the total composition.

2. The composition of claim 1 where the vinyl insaturated material constitutes from 15 to 40%, by weight, of the total composition.

3. The composition of claim 1 where the vinyl unsaturated material is a mixture of a monofunctional compound and a difunctional compound.

4. The composition of claim 3 where the vinyl unsaturated material is a mixture of styrene and divinyl benzene.

5. The composition of claim 1 where the polyphenylene ether is poly-(2,6-dimethyl-1,4-phenylene)ether.

6. The composition of claim 5 where the vinyl unsaturated material is styrene.

7. The composition of claim 5 where the vinyl unsaturated material is monochloro-styrene.

8. The composition of claim 5 where the vinyl unsaturated material is dichloro styrene.

9. The composition of claim 5 where the vinyl material is a mixture of styrene and divinyl benzene.

10. The composition of claim 1 where the polyphenylene ether is poly(2,6-diphenyl-1,4-phenylene)ether.

11. The composition of claim 1 including a catalyst capable of generating free radicals to initiate polymerization of the vinyl unsaturated material.

12. The composition of claim 1 including a curing agent for the vinyl unsaturated material.

13. The composition of claim 1 in the form of free flowing powder or pellets.

14. A composition in the form of free flowing powders or pellets consisting of from 99 to 40 percent, by weight, of a poly(2,6-dimethyl-1,4-phenylene)ether and from 1 to 60%, by weight of a liquid vinyl unsaturated material selected from the group consisting of styrene, divinyl benzene, monochloro styrene, dichloro styrene, vinyl pyridine and mixtures thereof.

15. The composition of claim 14 where the vinyl unsaturated material constitutes from 15 to 40 percent, by weight, of the total composition.

16. A process for forming a shaped article from a polyphenylene ether composition by melt processing comprising:
  (a) forming free flowing pellets or powder of a polyphenylene ether composition by blending the polyphenylene ether in the form of powder or pellets with from 1 to 60 percent, by weight, of a liquid vinyl unsaturated material having a general formula selected from the group consisting of

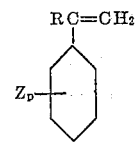

and

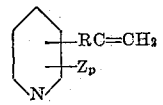

where R is a member selected from the group consisting of hydrogen and methyl; Z is a member selected from the group consisting of vinyl, hydrogen, halogen, alkyl and alkoxy; and p is a whole number equal to from 0 to 3;
  (b) melt processing the polyphenylene ether to a desired shape; and
  (c) curing the vinyl unsaturated constituent of said polyphenylene ether composition.

17. The process of claim 16 where the vinyl constituent comprises from 15 to 40 percent, by weight, of the composition.

18. The process of claim 16 where the polyphenylene ether composition includes a catalyst capable of generating free radicals to initiate polymerization of the vinyl unsaturated material.

19. The process of claim 16 where the polyphenylene ether composition consists of a poly-(2,6-dimethyl-1,4-phenylene)ether and styrene.

20. The process of claim 16 where the polyphenylene ether composition consists of a poly-(2,6-dimethyl-1,4-phenylene)ether and a mixture of styrene and divinyl benzene.

21. The process of claim 16 where the polyphenylene ether composition consists of a poly-(2,6-diphenyl-1,4-phenylene)ether and styrene.

22. The process of claim 16 where the shaped article is formed by extrusion at a temperature below 275° C.

23. The process of claim 16 where curing is performed by exposure of the composition to heat.

24. The process of claim 16 where curing is performed by exposure of the composition to a source of radiation.

25. A process for forming a shaped article from a polyphenylene ether composition by melt processing comprising:
  (a) forming free flowing powders or pellets of a poly-(2,6-dimethyl-1,4-phenylene)ether composition by blending powder or pellets of the polymer with from 1 to 60 percent, by weight, of a liquid vinyl unsaturated material selected from the group consisting of styrene, divinyl benzene, monochloro styrene, dichlorostyrene, vinyl pyridine and mixtures thereof,
(b) extruding the composition to a desired shape at a temperature below 275° C.; and
(c) curing the vinyl unsaturated component of said polyphenylene ether composition by exposure to heat or irradiation.

26. The process of claim 25 where the vinyl unsaturated material constitutes from 15 to 40 percent, by weight, of the total composition.

No References Cited.

SAMUEL H. BLECH, *Primary Examiner.*

D. J. BREZNER, *Assistant Examiner.*